United States Patent
Liu et al.

(10) Patent No.: US 11,234,211 B2
(45) Date of Patent: Jan. 25, 2022

(54) METHOD, NETWORK NODE AND TERMINAL DEVICE FOR WIRELESS COMMUNICATION

(71) Applicant: GUANGDONG OPPO MOBILE TELECOMMUNICATIONS CORP., LTD., Guangdong (CN)

(72) Inventors: Jianhua Liu, Guangdong (CN); Zhi Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/638,538

(22) PCT Filed: Jun. 14, 2017

(86) PCT No.: PCT/CN2017/088266
§ 371 (c)(1),
(2) Date: Feb. 12, 2020

(87) PCT Pub. No.: WO2018/227433
PCT Pub. Date: Dec. 20, 2018

(65) Prior Publication Data
US 2020/0205125 A1   Jun. 25, 2020

(51) Int. Cl.
*H04W 68/02* (2009.01)
*H04W 76/28* (2018.01)
(Continued)

(52) U.S. Cl.
CPC ............ *H04W 68/02* (2013.01); *H04W 8/22* (2013.01); *H04W 28/0215* (2013.01); *H04W 68/005* (2013.01); *H04W 76/28* (2018.02)

(58) Field of Classification Search
CPC ....... H04W 68/02; H04W 76/28; H04W 8/22; H04W 28/0215; H04W 68/005; H04W 76/10
(Continued)

(56) References Cited

U.S. PATENT DOCUMENTS

| 9,615,351 | B2 | 4/2017 | Zhu et al. |
| 2008/0081645 | A1* | 4/2008 | Kim ................... H04W 68/025 455/458 |

(Continued)

FOREIGN PATENT DOCUMENTS

| CN | 103428809 A | 12/2013 |
| CN | 105706507 A | 6/2016 |

(Continued)

OTHER PUBLICATIONS

International Search Report in the international application No. PCT/CN2017/088266, dated Mar. 5, 2018.
(Continued)

*Primary Examiner* — Inder P Mehra
(74) *Attorney, Agent, or Firm* — Perkins Coie LLP

(57) ABSTRACT

Disclosed in the embodiments of the present application is a method, network node, and terminal device for wireless communication. The method comprises: acquiring by a first network node, a working bandwidth capability of at least one terminal device to be paged; and sending by the first network node, according to the working bandwidth capability of the at least one terminal device, a paging message to the at least one terminal device. The method, the network node and the terminal device in the embodiments of the present application can effectively improve scheduling flexibility of paging messages.

8 Claims, 11 Drawing Sheets

(51) Int. Cl.
*H04W 8/22* (2009.01)
*H04W 28/02* (2009.01)
*H04W 68/00* (2009.01)
*H04W 76/10* (2018.01)

(58) Field of Classification Search
USPC .......................................................... 370/329
See application file for complete search history.

(56) References Cited

U.S. PATENT DOCUMENTS

| | | | |
|---|---|---|---|
| 2009/0010213 A1 | 1/2009 | Yamada | |
| 2009/0280823 A1* | 11/2009 | Petrovic | H04W 68/02 455/453 |
| 2011/0065461 A1* | 3/2011 | Kang | H04W 68/02 455/458 |
| 2015/0078329 A1 | 3/2015 | Zhu et al. | |
| 2016/0044550 A1* | 2/2016 | Lee | H04W 36/08 370/331 |
| 2016/0270028 A1 | 9/2016 | Lee et al. | |
| 2016/0295549 A1 | 10/2016 | Sebire et al. | |
| 2017/0181123 A1 | 6/2017 | Schliwa-Bertling et al. | |
| 2017/0181124 A1 | 6/2017 | Zhu et al. | |
| 2018/0199344 A1* | 7/2018 | Liao | H04L 5/001 |
| 2019/0141672 A1 | 5/2019 | Zhu et al. | |

FOREIGN PATENT DOCUMENTS

| | | |
|---|---|---|
| CN | 105828436 A | 8/2016 |
| CN | 106538019 A | 3/2017 |
| KR | 20070030001 A | 3/2007 |
| WO | 2015115981 A1 | 8/2015 |

OTHER PUBLICATIONS

English translation of the Written Opinion of the International Search Authority in the international application No. PCT/CN2017/088266, dated Mar. 5, 2018.
Panasonic: "Configuration of DL control resource set and UE bandwidth", 3GPP TSG-RAN WG1 NR AdHoc R1-1700639; Jan. 9, 2017.
LG Electronics: "Discussion on Resource Allocation", 3GPP TSG RAN WG1 Meeting #89; R1-1707652; May 5, 2017.
LG Electronics: "Discussion on CSS configuration for wideband operation"; 3GPP TSG RAN WG1 Meeting #89 R1-1707627; May 6, 2017.
First Office Action of the Taiwanese application No. 107118394, dated Feb. 27, 2020.
First Office Action of the Chinese application No. 201780048204.4, dated May 15, 2020.
3GPP TSG RAN WG1 Meeting #89 R1-1706975, "Multi-beam Paging for NR", Huawei, Hangzhou, China, May 15-19, 2017.
3GPP TSG-RAN WG1 Meeting #89 R1-1708573, "Paging Design Consideration", Qualcomm Incorporated, Hangzhou, China, May 15-19, 2017.
Second Office Action of the Chinese application No. 201780048204.4, dated Jan. 4, 2021.
First Office Action of the Korean application No. 10-2020-7001070, dated Feb. 26, 2021.
Supplementary European Search Report in the European application No. 17913980.3, dated Feb. 26, 2021.
Notice of Rejection of the Korean application No. 10-2020-7001070, dated Aug. 10, 2021. 6 pages with English translation.

\* cited by examiner

METHOD, NETWORK NODE AND TERMINAL DEVICE FOR WIRELESS COMMUNICATION

CROSS-REFERENCE TO RELATED APPLICATIONS

The application is the U.S. national phase of International Application No. PCT/CN2017/088266 filed on Jun. 14, 2017, the disclosure of which is incorporated by reference herein in its entirety.

TECHNICAL FIELD

Embodiments of the application relate to the field of communication, and more particularly, to a wireless communication method, a network node and a terminal device.

BACKGROUND

A system bandwidth of Long Term Evolution (LTE) may be 1.4 MHz/3 MHz/5 MHz/10 MHz/15 MHz/20 MHz, while a bandwidth capability of a terminal is 20 MHz. Therefore, the terminal may operate in any one of the above system bandwidths. In a 5th Generation (5G) system, a system bandwidth is great. For example, the system bandwidth reaches hundreds of megahertz. Considering different application scenarios and production cost, not all 5G terminals are required to have radio frequency bandwidths reaching the system bandwidth. Therefore, various terminals with different radio frequency bandwidth capabilities may be supported in a future 5G system, and furthermore, how to improve the flexibility of scheduling the paging message in the 5G system is always a problem needing to be researched.

SUMMARY

In view of this, the embodiments of the application provide a wireless communication method, a network node and a terminal device, which facilitate the obtaining of a frequency diversity gain and improve the flexibility of scheduling the paging message.

A first aspect provides a method for wireless communication, which may include operations that: a first network node acquires an operating bandwidth capability of at least one terminal device to be paged; and the first network node sends a paging message to the at least one terminal device according to the operating bandwidth capability of the at least one terminal device.

The technical solution of the embodiments of the application is applied to a scenario of paging of a Core Network (CN) and also applied to a scenario of paging of a Radio Access Network (RAN). That is, a CN node may trigger a RAN node to initiate paging, or a primary RAN node may trigger a secondary RAN node to initiate paging.

The operating bandwidth capability of the terminal device refers to a maximum operating bandwidth supported by the terminal device.

Paging based on the operating bandwidth capability of the terminal device may effectively improve the flexibility of scheduling the paging message.

In a possible implementation mode, the operation that the first network node sends the paging message to the at least one terminal device according to the operating bandwidth capability of the at least one terminal device may include operations that: the first network node selects a minimum operating bandwidth capability from the operating bandwidth capability of the at least one terminal device; and the first network node sends the paging message to each terminal device according to the minimum operating bandwidth capability.

Optionally, if the CN is required to initiate paging to a terminal device, a base station may acquire an operating bandwidth capability of the terminal device only and initiate paging to the terminal device in a bandwidth corresponding to the operating bandwidth capability of the terminal device.

In a possible implementation mode, the at least one terminal device may include multiple terminal devices, and the method may further include an operation that the first network node divides the multiple terminal devices into multiple terminal groups; and the operation that the first network node sends the paging message to the at least one terminal device according to the operating bandwidth capability of the at least one terminal device may include operations that: the first network node selects a minimum operating bandwidth capability from operating bandwidth capabilities of all terminal devices in a first terminal group of the multiple terminal group, and the first network node sends the paging message to each terminal device in the first terminal group according to the minimum operating bandwidth capability.

Paging of terminals in the terminal groups is similar to paging when they are not grouped.

Optionally, the base station may select the minimum operating bandwidth capability from the operating bandwidth capabilities of all the terminal devices to be paged or the operating bandwidth capabilities of all the terminal devices in the terminal groups for paging, and may also select any operating bandwidth capability.

In a possible implementation mode, the operation that the first network node divides the multiple terminal devices into the multiple terminal groups may include an operation that the first network node divides the multiple terminal devices into the multiple terminal groups according to at least one bandwidth range.

The bandwidth range may be understood as an frequency band range formed by an upper limit frequency point and a lower limit frequency point and may also be understood as two frequency band ranges that can be obtained by dividing according to a frequency point. The base station may also group the multiple terminal devices in another manner. For example, the base station may divide two terminal devices into a group or divide three terminal devices into a group as a default.

In a possible implementation mode, the operation that the first network node sends the paging message to each terminal device in the first terminal group according to the minimum operating bandwidth capability may include operations that: the first network node determines a sending frequency band for sending of the paging message according to the minimum operating bandwidth capability; and the first network node sends the paging message to each terminal device in the first terminal group in the sending frequency band.

In a possible implementation mode, the method may further include an operation that the first network node determines a center frequency point of the paging message corresponding to the first terminal group; and the operation that the first network node determines the sending frequency band for sending of the paging message according to the minimum operating bandwidth capability may include an operation that the first network node determines the sending frequency band according to the minimum operating bandwidth capability and the center frequency point.

The base station may also determine a frequency band where the paging message that should be sent to the terminal devices of each group by the base station is located based on grouping of the terminal devices.

It is to be understood that the sending frequency band for the paging message limits a range of frequency resources for sending of the paging message. This means that the frequency resources of the sending frequency band may be used to send the paging message. However, not all the frequency resources in the sending frequency band are used to send the paging message, and the specific frequency resource for the paging message in the band range may be scheduled and indicated by the base station.

In a possible implementation mode, the operation that the first network node acquires the operating bandwidth capability of the at least one terminal device to be paged may include an operation that the first network node receives the operating bandwidth capability of each of the at least one terminal device from a second network node.

In a possible implementation mode, the operation that the first network node acquires the operating bandwidth capability of the at least one terminal device to be paged may include an operation that the first network node acquires the operating bandwidth capability of each of the at least one terminal device according to an Identifier (ID) of the terminal device and mapping relationships between IDs and operating bandwidth capabilities of terminal devices.

In a possible implementation mode, the operation that the first network node acquires the operating bandwidth capability of the at least one terminal device to be paged may include an operation that the first network node acquires the operating bandwidth capability of each of the at least one terminal device from at least one transparent container corresponding to the at least one terminal device.

The transparent container is a carrier or cell encapsulated with some information of the terminal, such as, bandwidth capability information, terminal capability level of the terminal, etc. In a possible implementation mode, the at least one terminal device may correspond to the at least one transparent container one to one.

Optionally, an operating bandwidth capability of a terminal device may be encapsulated in a transparent container in advance, or operating bandwidth capabilities of multiple terminal devices may be encapsulated in a transparent container.

In a possible implementation mode, the method may further include an operation that, before the operation that the first network node acquires the operating bandwidth capability of each of the at least one terminal device from the at least one transparent container corresponding to the at least one terminal device, the first network node receives the at least one transparent container sent by the second network node, under a case that the second network node initiates paging to the at least one terminal device.

Optionally, the base station may send the predetermined mapping relationship mentioned above, the bandwidth range for grouping and an ID of each terminal group to the terminal device. Further the base station may send them to the terminal device through a broadcast message.

A second aspect provides a method for wireless communication, which may include operations that: a second network node determines at least one terminal device to be paged; and the second network node sends first information to a first network node, the first information is used for the first network node to determine a bandwidth for sending of a paging message to the at least one terminal device.

The information through which the bandwidth used to send the paging message may be determined is sent to the first network node, so that improvement of paging message scheduling flexibility is facilitated.

In a possible implementation mode, the first information may be an operating bandwidth capability of each of the at least one terminal device, and the method may further include an operation that the second network node determines the operating bandwidth capability of each of the at least one terminal device.

In a possible implementation mode, the operation that the second network node determines the operating bandwidth capability of each of the at least one terminal device may include an operation that the second network node determines the operating bandwidth capability of each of the at least one terminal device according to an ID of the terminal device and mapping relationships between IDs and operating bandwidth capabilities of terminal devices.

In a possible implementation mode, the first information may be at least one transparent container corresponding to the at least one terminal device, and the at least one transparent container may be configured to encapsulate the operating bandwidth capability of each of the at least one terminal device.

In a possible implementation mode, the at least one terminal device may correspond to the at least one transparent container one to one.

A third aspect provides a wireless communication method, which may include operations that: a terminal device determines a sending frequency band for a paging message corresponding to the terminal device according to a center frequency point of the paging message; and the terminal device receives the paging message sent by a first network node in the sending frequency band.

Sending frequency bands for the paging message are determined according to center frequency points of different terminal devices, so that improvement of paging message scheduling flexibility is facilitated.

In a possible implementation mode, the method may further include operations that: the terminal device determines the center frequency point of the paging message corresponding to the terminal device according to an ID of a terminal group to which the terminal device belongs and mapping relationships between terminal groups and center frequency points; or the terminal device determines the center frequency point of the paging message corresponding to the terminal device according to a bandwidth range to which an operating bandwidth capability of the terminal device belongs and mapping relationships between bandwidth ranges and center frequency points.

In a possible implementation mode, the method may further include an operation that, before the operation that the terminal device determines the sending frequency band for the paging message according to the center frequency point of the paging message corresponding to the terminal device, the terminal device receives at least one of the following information sent by the first network node: the ID of the terminal group to which the terminal device belongs, the bandwidth range to which that the terminal device belongs, the mapping relationships between terminal groups and center frequency points and mapping relationships between bandwidth ranges and center frequency points.

In a possible implementation mode, the at least one of the following information may be predetermined in a protocol: the ID of the terminal group to which the terminal device belongs, the bandwidth range to which the terminal device belongs, the mapping relationships between terminal groups and center frequency points and the mapping relationships between bandwidth ranges and center frequency points.

A fourth aspect provides a network node, which is configured to execute the method in the first aspect or any possible implementation mode of the first aspect. Specifically, the network node includes units configured to execute the method in the first aspect or any possible implementation mode of the first aspect.

A fifth aspect provides a network node, which is configured to execute the method in the second aspect or any possible implementation mode of the second aspect. Specifically, the network node includes units configured to execute the method in the second aspect or any possible implementation mode of the second aspect.

A sixth aspect provides a terminal device, which is configured to execute the method in the third aspect or any possible implementation mode of the third aspect. Specifically, the terminal device includes units configured to execute the method in the third aspect or any possible implementation mode of the third aspect.

A seventh aspect provides a network node, which includes a memory, a processor, an input interface and an output interface. The memory, the processor, the input interface and the output interface are connected through a bus system. The memory is configured to store an instruction. The processor is configured to execute the instruction stored in the memory to execute the method in the first aspect or any possible implementation mode of the first aspect.

An eighth aspect provides a network node, which includes a memory, a processor, an input interface and an output interface. The memory, the processor, the input interface and the output interface are connected through a bus system. The memory is configured to store an instruction. The processor is configured to execute the instruction stored in the memory to execute the method in the second aspect or any possible implementation mode of the second aspect.

A ninth aspect provides a terminal device, which includes a memory, a processor, an input interface and an output interface. The memory, the processor, the input interface and the output interface are connected through a bus system. The memory is configured to store an instruction. The processor is configured to execute the instruction stored in the memory to execute the method in the third aspect or any possible implementation mode of the third aspect.

A tenth aspect provides a computer storage medium, which is configured to store a computer software instruction for executing the method in the first aspect or any possible implementation mode of the first aspect, the method in the second aspect or any possible implementation mode of the second aspect or the method in the third aspect or any possible implementation mode of the third aspect, the instruction includes a program designed to execute the aspects.

An eleventh aspect provides a computer program product including an instruction, which runs in a computer to enable the computer to execute the method in the first aspect or any optional implementation mode of the first aspect, or the method in the second aspect or any optional implementation mode of the second aspect or the method in the third aspect or any optional implementation mode of the third aspect.

These aspects or other aspects of the application will become clearer and easier to understand through the following descriptions about the embodiments.

DETAILED DESCRIPTION

The technical solutions in the embodiments of the application will be clearly and completely described below in combination with the drawings in the embodiments of the application.

It is to be understood that the technical solutions of the embodiments of the application may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), an LTE system, an LTE Frequency Division Duplex (FDD) system, LTE Time Division Duplex (TDD), a Universal Mobile Telecommunication System (UMTS), a Worldwide Interoperability for Microwave Access (WiMAX) communication system, a New Radio (NR) or future 5G system.

Particularly, the technical solutions of the embodiments of the application may be applied to various nonorthogonal multiple access technology-based communication systems, for example, a Sparse Code Multiple Access (SCMA) system and a Low Density Signature (LDS) system, and of course, the SCMA system and the LDS system may also have other names in the field of communication. Furthermore, the technical solutions of the embodiments of the application may be applied to multi-carrier transmission systems adopting nonorthogonal multiple access technologies, for example, Orthogonal Frequency Division Multiplexing (OFDM), Filter Bank Multi-Carrier (FBMC), Generalized Frequency Division Multiplexing (GFDM) and Filtered-OFDM (F-OFDM) systems adopting the nonorthogonal multiple access technologies.

Figure 1:
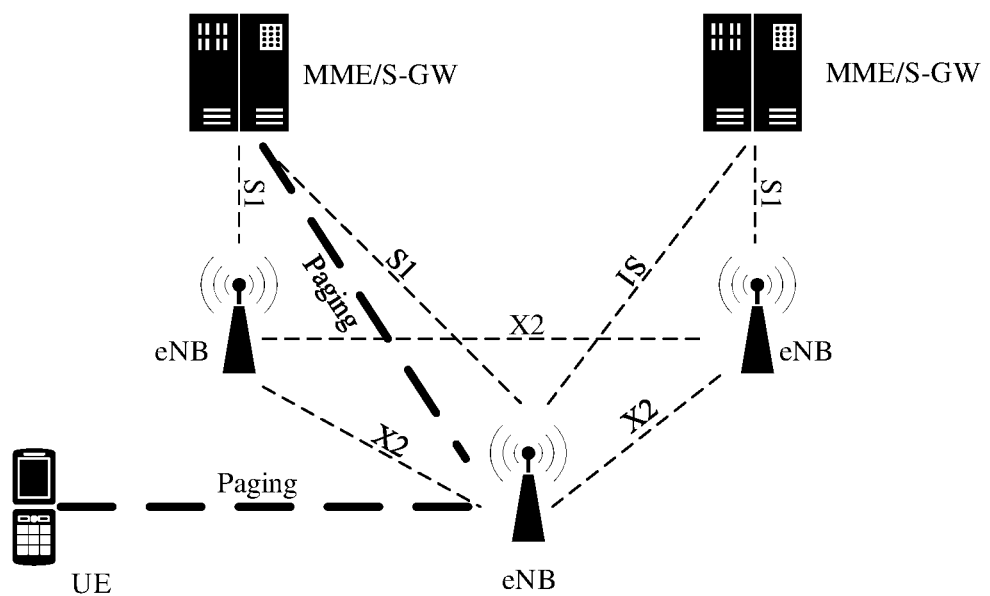
FIG. 1 is a specific application scenario according to an embodiment of the application.

FIG. 1 is a schematic diagram of an implementation environment involved in an embodiment of the application. The implementation environment includes terminal devices, access network devices and CN devices. S1 interfaces are configured for communication between the access network devices and the CN devices, and X2 interfaces are configured for communication between the access network devices.

In the embodiments of the application, the terminal device may communicate with one or more CNs through a RAN. The terminal device may be called an access terminal, User Equipment (UE), a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device and a terminal device in a future 5G network.

The access network device is a network element in an access network. As shown in FIG. 1, for example, for a UMTS, the access network node may be a Node Base (NB) and may also be a Radio Network Controller (RNC). In a wireless LTE network architecture, a base station is an Evolved Node Base station (eNB).

The CN device is a network element in a CN. As shown in FIG. 1, for example, for the wireless LTE network architecture, the CN device includes a Mobility Management Entity (MME) and a Serving GateWay (S-GW)/Packet Data Network (PDN) GateWay (P-GW). The MME is mainly configured to complete mobility management and session management of the terminal device. The S-GW is mainly responsible for forwarding data between the eNB and the P-GW. The P-GW is mainly responsible for processing an Internet Protocol (IP) data service.

A network may usually send paging to UE in an idle state and a connected state. As shown in FIG. 1, a paging process may be triggered by the CN to notify a certain piece of UE to receive a paging request, or may also be triggered by the eNodeB to notify system information update and notify the UE to receive information of an Earthquake and Tsunami Warning System (ETWS), Commercial Mobile Alert Service (CMAS), etc.

A system bandwidth of LTE is 1.4 MHz/3 MHz/5 MHz/10 MHz/15 MHz/20 MHz, while a bandwidth capability of a terminal is 20 MHz. Therefore, the UE may operate in any one of the above system bandwidths. A paging message in an LTE system is born in a Physical Downlink Shared Channel (PDSCH) scheduled by a Physical Downlink Control Channel (PDCCH). A PDSCH may contain paging messages of at most 16 pieces of UE. Paging messages of multiple pieces of UE form a paging record list, and UE reads a paging record of each piece of UE in the paging record list, the paging record including a UE-identity of UE to be paged. The UE, if finding that its own UE-identity is consistent with a certain UE-identity, determines that it is paged by a network. Since paging messages of multiple pieces of UE are transmitted in a PDSCH and a network does not know channel quality of the UE in an idle state, the network, when sending paging to the UE, may usually adopt a conservative Modulation and Coding Scheme (MCS), a relatively low code rate or a relatively great scheduling bandwidth to ensure that the UE at an edge of a cell may receive a paging message.

In a 5G system, a system bandwidth is great. For example, the system bandwidth reaches hundreds of megahertz. Considering different application scenarios and production cost, not all 5G terminals are required to have radio frequency bandwidths reaching the system bandwidth. Therefore, various terminals with different radio frequency bandwidth capabilities may be supported in a future 5G system. For example, terminals with bandwidths of 5 MHz, 10 MHz, 20 MHz, 40 MHz, 100 MHz, 200 MHz, etc. are simultaneously supported.

When a CN triggers an access network to send a paging message to a terminal, the access network may not know a bandwidth capability of the terminal, and thus the access network may send the paging message to the terminal in a minimum terminal bandwidth that a system may support. For example, if 5 MHz is a minimum terminal bandwidth that a 5G system supports, the access network sends a paging message to all terminals in an idle state in 5 MHz only. This greatly limits scheduling of the system. On one hand, resources in the minimum bandwidth 5 MHz are limited, and consequently, sending quality of the paging message may be influenced, for example, resources that may be scheduled to send the paging message in 5 MHz are not enough, and cell coverage is further influenced. On the other hand, during operation in a high band (band above 6 GHz), the paging message is required to be transmitted in a beam scanning manner to cover all downlink beams. Consequently, if the paging message is limited in a small bandwidth, a transmission duration of the paging message may inevitably be prolonged, and when all the beams are traversed to send the paging message, a relatively long transmission time may be occupied by the whole paging message. If no other UE transmits data in a scanned beam, a resource utilization rate of the whole system bandwidth is not so high.

For the above problems, the present application discloses a solution. The technical solutions disclosed in the embodiments of the application will be described below in combination with the drawings in detail.

It is to be understood that terms "system" and "network" in the disclosure may usually be exchanged in the disclosure. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

Figure 2:
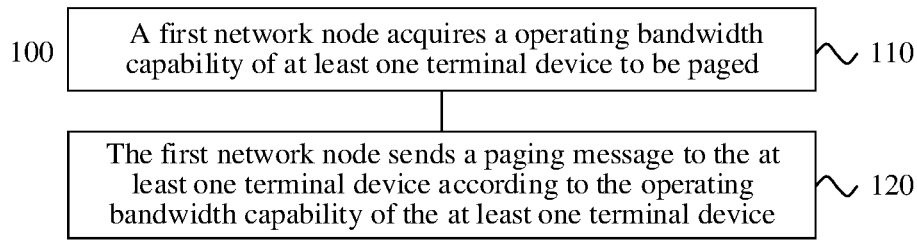
FIG. 2 is a schematic block diagram of a wireless communication method according to an embodiment of the application.

FIG. 2 is a schematic block diagram of a wireless communication method 100 according to an embodiment of the application. As shown in FIG. 2, the method 100 includes the following operations.

In S110, a first network node acquires an operating bandwidth capability of at least one terminal device to be paged.

In S120, the first network node sends a paging message to the at least one terminal device according to the operating bandwidth capability of the at least one terminal device.

It is to be understood that the technical solution of the embodiment of the application is applied to a scenario of paging of a CN and also applied to a scenario of paging of a RAN. For example, the first network node may be a base station. The embodiment of the application will be described below with a scenario of paging of a CN as an example.

The operating bandwidth capability of the terminal device refers to a maximum operating bandwidth supported by the terminal device. For example, if the operating bandwidth capability of the terminal device is 20 MHz, it may mean that the terminal device may operate in maximally 20 MHz.

When the terminal device is in an idle state and the CN is required to interact with the terminal device, the CN may notify the terminal device in a paging manner Specifically, the CN is required to determine the specific terminal device to be paged at first, the CN may send a paging message to a base station, and the base station may further acquire the operating bandwidth capability of the terminal device to be paged. For example, the CN may store operating bandwidth capabilities of all terminal devices in the CN in advance, and when the CN determines the specific terminal device to be paged, the CN may look up a mapping table between IDs and operating bandwidth capabilities of terminals to acquire the operating bandwidth capability of the terminal device to be paged and send the acquired operating bandwidth capability of the terminal device to be paged to the base station. After the base station acquires the operating bandwidth capability of the terminal device to be paged, the base station may send the paging message to the terminal device according to the acquired operating bandwidth capability.

It is to be understood that, in the embodiment of the application, if the CN is required to initiate paging to only one terminal device, the base station may acquire an operating bandwidth capability of the terminal device only and initiate paging to the terminal device in a bandwidth corresponding to the operating bandwidth capability of the terminal device; and if the CN is required to initiate paging to multiple terminal devices, the base station may acquire an operating bandwidth capability of each of the multiple terminal devices and determine a bandwidth for initiating paging to the multiple terminal devices according to a certain rule, and the base station may further initiate paging to the multiple terminal devices in the determined bandwidth.

In such a manner, according to the wireless communication method of the embodiment of the application, the paging message is sent according to the operating bandwidth capability of the terminal device, so that full utilization of performance of the terminal device is facilitated, and the flexibility of scheduling the paging message is further improved.

Optionally, in the embodiments of the application, the operation that the first network node sends the paging message to the at least one terminal device according to the operating bandwidth capability of the at least one terminal device includes operations that: the first network node selects a minimum operating bandwidth capability from the operating bandwidth capability of the at least one terminal device; and the first network node sends the paging message to each terminal device according to the minimum operating bandwidth capability.

Specifically, the base station, after acquiring the operating bandwidth capability of the at least one terminal device to be paged, may select one bandwidth therefrom as a sending bandwidth for the paging message. For example, if the base station acquires that the paging message is required to be sent to three terminal devices under the base station and operating bandwidth capabilities of the three terminal devices may be acquired in a certain manner and may be, for example, 20 MHz/40 MHz/100 MHz, the base station, considering multiple factors such as sending quality of the paging message and a capability of ensuring that the terminals may be paged as much as possible, may select a sending bandwidth for the paging message, namely a bandwidth required by a PDSCH for sending the paging message and a PDCCH scheduling the PDSCH. For example, the base station may select a minimum operating bandwidth 20 MHz as the sending bandwidth for the paging message to ensure that all the three terminal devices may be paged. For example, the base station may also select a maximum operating bandwidth 100 MHz as the sending bandwidth for the paging message to ensure the sending quality of the paging message. The base station may also select an intermediate operating bandwidth 40 MHz as the sending bandwidth for the paging message to balance the sending quality and a probability that the terminal devices are paged.

Optionally, in the embodiment of the application, the at least one terminal device includes multiple terminal devices, and the method further includes an operation that the first network node divides the multiple terminal devices into multiple terminal groups; and the operation that the first network node sends the paging message to the at least one terminal device according to the operating bandwidth capability of the at least one terminal device includes operations that: the first network node selects a minimum operating bandwidth capability from operating bandwidth capabilities of all terminal devices in a first terminal group of the multiple terminal groups, and the first network node sends the paging message to each terminal device in the first terminal group according to the minimum operating bandwidth capability.

Specifically, if there are multiple terminal devices to be paged, the base station may also group the multiple terminal devices at first and select, in a group, a sending bandwidth for the paging message corresponding to the group according to the above rule. For example, if the base station is required to send the paging message to six terminal devices at the same paging moment in the same PDSCH and operating bandwidth capabilities, acquired by the base station, of the six terminal devices are 20 MHz/40 MHz/20 MHz/80 MHz/100 MHz/200 MHz respectively, the base station may divide the six terminal devices into two groups, including a first terminal group of which the operating bandwidth capabilities are {20 MHz/40 MHz/20 MHz} and a second terminal group with the operating bandwidth capabilities are {80 MHz/100 MHz/200 MHz} respectively. The base station may send the paging message to the six terminal devices based on a minimum bandwidth capability 20 MHz in the first terminal group and a minimum bandwidth capability 80 MHz in the second terminal group respectively. That is, a PDSCH for sending the paging message and a PDCCH scheduling the PDSCH may be sent in bandwidths corresponding to the minimum operating bandwidth capabilities of the two groups respectively. For another example, the base station may divide the six terminal devices into three groups, including a first terminal group {20 MHz/20 MHz}, a second terminal group {40 MHz/80 MHz} and a third terminal group {100 MHz/200 MHz} respectively. The base station may send the paging message to the six terminal devices based on a minimum bandwidth capability 20 MHz in the first terminal group, a minimum bandwidth capability 40 MHz in the second terminal group and a minimum operating bandwidth capability 100 MHz in the third terminal group. That is, the PDSCH for sending the paging message and the PDCCH scheduling the PDSCH may be sent in bandwidths corresponding to the minimum operating bandwidth capabilities of the three groups respectively.

Similar to the case that the terminal devices are not grouped, the bandwidth selected by the base station from each of the terminal groups to send the paging message to the terminal devices in the group may not always be the minimum operating bandwidth of all the terminal devices in the terminal group, and may be an operating bandwidth of any terminal device. The embodiment of the application is not limited thereto and details refer to the descriptions about the case that the terminal devices are not grouped.

Optionally, in the embodiment of the application, the operation that the first network node divides the at least one terminal device into the multiple terminal groups includes an operation that the first network node divides the at least one terminal device into the multiple terminal groups according to at least one bandwidth range.

It is to be understood that the bandwidth range may be understood as a frequency band range formed by an upper limit frequency point and a lower limit frequency point and may also be understood that two frequency band ranges can be obtained by dividing according to a frequency point. For example, the bandwidth range may be [20 MHz-40 MHz) [40 MHz-100 MHz]. The bandwidth range may also be 40 MHz, that is, the bandwidth range may be two ranges, one is less than 40 MHz and the other is more than or equal to 40 MHz.

For example, the base station may preset two ranges, i.e., [20 MHz-40 MHz] and (40 MHz-100 MHz] respectively, and after the base station acquires the six terminal devices respectively, the base station may divide the terminals into two terminal groups of which the operating bandwidth capabilities are {20 MHz/40 MHz/20 MHz} and {80 MHz/ 100 MHz/200 MHz} respectively.

The base station may also group the multiple terminal devices in another manner. For example, the base station may divide two terminal devices into a group or divide three terminal devices into a group as a default. Such grouping manners are only examples for description and the embodiment of the application is not limited thereto.

Optionally, in the embodiment of the application, the operation that the first network node sends the paging message to the at least one terminal device according to the operating bandwidth capability of the at least one terminal device includes operations that the first network node determines a sending frequency band for sending of the paging message according to a determined bandwidth for sending of the paging message to the at least one terminal device; and the first network node sends the paging message to the at least one terminal device in the sending frequency band.

Optionally, in the embodiment of the application, the operation that the first network node sends the paging message to each terminal device in the first terminal group according to the minimum operating bandwidth capability includes operations that: the first network node determines a sending frequency band for sending of the paging message according to the minimum operating bandwidth capability; and the first network node sends the paging message to each terminal device in the first terminal group in the sending frequency band.

That is, operating bandwidth capabilities of different terminals may be mapped to sending frequency bands for different paging messages in advance. For example, if a network system band is 0-200 MHz, the base station may make the operating bandwidth capability 20 MHz of the terminal correspond to a frequency band 0-20 MHz, make the operating bandwidth capability 40 MHz of the terminal correspond to a frequency band 40 MHz-80 MHz, and so on. In a word, the base station may store mapping relationships between operating bandwidth capabilities of different terminals and the specific sending frequency bands in advance. The base station, after determining the bandwidth for sending of the paging message, may further look up a table to know the specific frequency band for sending of the paging message.

The base station may also determine a frequency band where the paging message that should be sent by the base station to the terminal devices of each group is located based on grouping of the terminal devices. For example, the six terminal devices are divided into two groups. If the network system frequency band is 0-200 MHz, the base station may make the operating bandwidth capability 20 MHz of the terminal correspond to the frequency band 0-20 MHz, make the operating bandwidth capability 40 MHz of the terminal correspond to the frequency band 40 MHz-80 MHz and make the bandwidth capability 80 MHz of the terminal correspond to the frequency band 100 MHz-180 MHz. According to such grouping, the base station determines that a bandwidth for sending of the paging message to the first terminal group is 20 MHz, and the base station determines that a bandwidth for sending of the paging message to the second terminal group is 80 MHz. In such case, the base station may know that the frequency band 0-20 MHz may be used to send the paging message to the terminal devices in the first terminal group and the band 100 MHz-180 MHz may be used to send the paging message to the terminal devices in the second terminal group.

It is to be understood that the sending frequency band for the paging message limits a range of frequency resources for sending of the paging message. This means that the frequency resources in the sending frequency band may be used to send the paging message. However, not all the frequency resources in the sending frequency band are used to send the paging message, and the specific frequency resource for the paging message in the frequency band range may be scheduled and indicated by the base station.

Furthermore, in the embodiments of the application, the method further includes an operation that the first network node determines a center frequency point of the paging message corresponding to the first terminal group; and the operation that the first network node determines the sending frequency band for sending of the paging message according to the minimum operating bandwidth capability includes an operation that the first network node determines the sending frequency band according to the minimum operating bandwidth capability and the center frequency point.

Specifically, the base station also maps the operating bandwidth capabilities of the terminals to center bands for sending of the paging message. After the base station determines the specific bandwidth for sending of the paging message to the terminal device, the base station may further acquire the respective center frequency point according to such a mapping relationship, and then the base station may further determine the band for sending of the paging message according to the determined bandwidth and center frequency point. For example, mapping relationships between center bands and operating bandwidth capabilities may be predetermined. For example, the bandwidth 20 MHz corresponds to a center frequency point 10 MHz, the bandwidth 40 MHz corresponds to a center frequency point 60 MHz, . . . and the bandwidth 80 MHz corresponds to a center frequency point 140 MHz. Then, the base station may further determine that a sending frequency band corresponding to the bandwidth 20 MHz is 0-20 MHz, a sending frequency band corresponding to the bandwidth 40 MHz is 40 MHz-80 MHz, . . . and a sending frequency band corresponding to the bandwidth 80 MHz is 100 MHz-180 MHz. Furthermore, the base station may send the paging message to a terminal device on the sending frequency band corresponding to the terminal device.

Optionally, the base station may send the predetermined mapping relationship motioned above, the bandwidth range for grouping and an ID of each terminal group to the terminal device. Further, the base station may send them to the terminal device through a broadcast message.

Optionally, in the embodiments of the application, the operation that the first network node acquires the operating bandwidth capability of the at least one terminal device to be paged includes an operation that the first network node receives the operating bandwidth capability of each of the at least one terminal device from a second network node.

Optionally, in the embodiment of the application, the operation that the first network node acquires the operating bandwidth capability of the at least one terminal device to be paged includes an operation that the first network node acquires the operating bandwidth capability of each of the at least one terminal device according to an ID of the terminal device and mapping relationships between IDs and operating bandwidth capabilities of terminal devices.

Optionally, in the embodiment of the application, the operation that the first network node acquires the operating bandwidth capability of the at least one terminal device to be paged includes an operation that the first network node acquires the operating bandwidth capability of each terminal device from at least one transparent container corresponding to the at least one terminal device.

The base station may directly acquire the operating bandwidth capability of the terminal device to be paged and may also acquire the operating bandwidth capability of the terminal device to be paged somewhere else. For example, the CN may acquire operating bandwidth capabilities of terminal devices under all base stations managed by it and map and store IDs and operating bandwidth capabilities of the terminal devices. When the CN triggers the base station to send the paging message to the terminal device, the CN may look up the mapping table to acquire the operating bandwidth capability of the terminal device to be paged and send the acquired operating bandwidth capability of the terminal device to be paged to the base station. The CN may also send the mapping table to the base station in advance, and when the CN triggers the base station to send the paging message to the terminal device, the base station may directly look up the mapping table to acquire the operating bandwidth capability of the terminal device to be paged.

In addition, the terminal device may also encapsulate its own operating bandwidth capability in a transparent container. Those skilled in the art should understand that the transparent container is a carrier or cell encapsulated with some information of the terminal, for example, bandwidth capability information or terminal capability level of the terminal. The transparent container may identify the terminal device through a serial number and the like, and the terminal device may send the transparent container encapsulated with its own operating bandwidth capability to the CN or the base station when being connected last time. The CN or the base station may store the transparent container. Then, when the CN is required to page multiple terminal devices, the CN may directly send transparent containers of the multiple terminal devices to the base station without acquiring operating bandwidth capabilities of the multiple terminal devices, or the base station, after receiving IDs of the multiple terminal devices, may also acquire the operating bandwidth capability of each of the terminal devices from a transparent container corresponding to the ID of the terminal device according to the ID.

It is to be understood that an operating bandwidth capability of a terminal device may be encapsulated in a transparent container in advance or operating bandwidth capabilities of multiple terminal devices may also be encapsulated in a transparent container. If the operating bandwidth capabilities of the multiple terminal devices required to be paged by the network are encapsulated in a transparent container, the CN may send the transparent container to the base station, or the base station may acquire the operating bandwidth capabilities of the multiple terminal devices from the transparent container. That is, a transparent container may correspond to a terminal device one to one, or a transparent container may correspond to multiple terminal devices. There are no limits made thereto in the embodiment of the application.

The operation that the base station acquires the operating bandwidth capability of the terminal device to be paged in the embodiments of the application will be described below based on two scenarios in detail respectively, one is for paging of the CN and the other is for paging of a RAN.

A first example: an MME, after obtaining bandwidth capability information of a terminal, stores bandwidth capability level information of the terminal, for example, the MME records a mapping relationship between a UE ID and bandwidth capability level information of a terminal to form a terminal bandwidth capability information record table and store it, and when the MME triggers a RAN node to send a paging message to the terminal, the MME queries the terminal bandwidth capability information record table according to the UE ID of the terminal to obtain the bandwidth capability information of the terminal and sends the bandwidth capability information to the RAN node.

Or the operating bandwidth capability information is encapsulated in a transparent container, the MME receives and stores the transparent container including an operating bandwidth capability of the terminal, and when the MME sends the paging message to the terminal, the MME sends the transparent container including the operating bandwidth capability information of the terminal to the RAN node.

A second example: a primary RAN node, after obtaining bandwidth capability information of a terminal, stores bandwidth capability level information of the terminal, for example, the primary RAN node records a mapping relationship between a UE ID and bandwidth capability level information of a terminal to form a terminal bandwidth capability information record table and store it, and when the primary RAN node triggers a secondary RAN node to send a paging message to the terminal, the primary RAN node queries the terminal bandwidth capability information record table according to the UE ID of the terminal to obtain the bandwidth capability information of the terminal and sends the bandwidth capability information to the secondary RAN node.

Or the operating bandwidth capability information is encapsulated in a transparent container, the primary RAN node receives and stores the transparent container including an operating bandwidth capability of the terminal, and when the primary RAN node triggers the secondary RAN node to send the paging message to the terminal, the primary RAN node sends the transparent container including the operating bandwidth capability information of the terminal to the secondary RAN node.

It is to be understood that, for the scenario of paging of the RAN, the first network node is not limited to the secondary RAN node and the first network node may also be the primary RAN node. That is, the solution of the embodiment of the application is also applied to interaction between different entities in the primary RAN node or different network elements for determination of the sending bandwidth for the paging message. There are no limits made thereto in the embodiments of the application.

Figure 3:
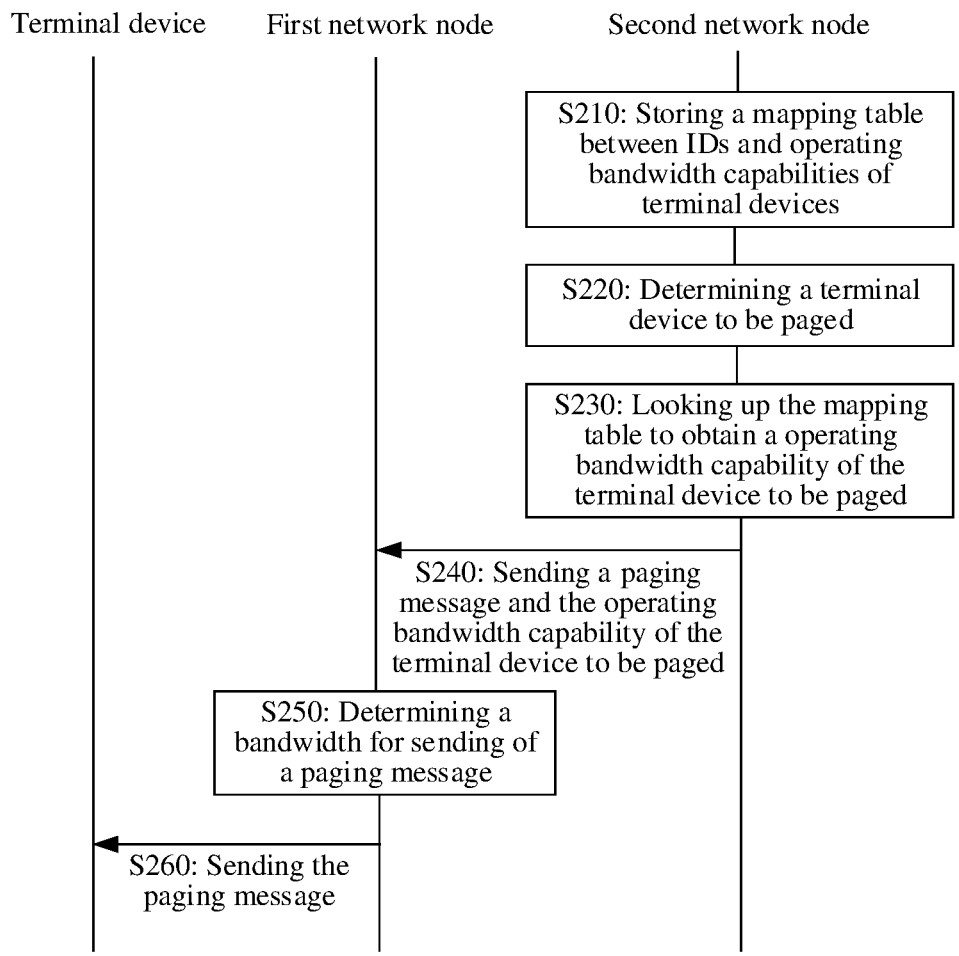
FIG. 3 is a schematic flowchart of a wireless communication method according to an embodiment of the application.

An interaction flowchart of a wireless communication method 200 of an embodiment of the application will be described below in combination with FIG. 3. As shown in FIG. 3, the method 200 includes the following operations.

In S210, a second network node may store a mapping table between an ID and operating bandwidth capability of a terminal device. For example, the second network node may store a mapping table between IDs and operating bandwidth capabilities of all terminal devices under a first network node.

In S220, the second network node determines a terminal device to be paged. Specifically, when the second network node is required to interact with some terminal devices, the second network node is required to determine these terminal devices at first and, for example, may know IDs of these terminal devices.

In S230, the second network node looks up the mapping table stored in S210 according to an ID of the terminal device to be paged determined in S220 to obtain an operating bandwidth capability of the terminal device to be paged determined in S220.

In S240, the second network node may send the operating bandwidth capability, determined in S230, of the terminal device to be paged to the first network node while sending a paging message to the first network node.

In S250, the first network node may determine a bandwidth for sending of the paging message in the operating bandwidth capability, sent in S240, of the terminal device to be paged based on a certain rule. For example, a minimum operating bandwidth capability sent in S240 may be selected.

In S260, the first network node may send the paging message to the terminal device to be paged based on the bandwidth, determined in S250, for sending of the paging message.

In such a manner, according to the wireless communication method of the embodiment of the application, a base station may send paging messages to the one or more target terminals based on operating bandwidth capability information of one or more target terminals to be paged, so that adaptation to an operating bandwidth capability of the terminal is achieved on one hand, sending of the paging message is optimized on the other hand, and when the terminal has a relatively high terminal bandwidth capability, the paging message may be flexibly sent based on its bandwidth capability to achieve a frequency diversity gain and scheduling flexibility.

In addition, the method of the embodiment of the application may also facilitate the reduction of a transmission duration of the paging message. For example, if a paging message is sent to 10 terminal devices in an existing manner in 5G, because a time-frequency resource size required by the paging message for the 10 terminal devices is fixed, at least six symbols on a time domain may be required if a bandwidth 10 MHz is a minimum terminal operating bandwidth of a system. However, with the embodiment of the present application, the minimum operating bandwidth capability is finally determined to be 20 MHz, the sending of the paging message to the 10 terminal devices can be achieved by three symbols on the time domain.

Figure 4:
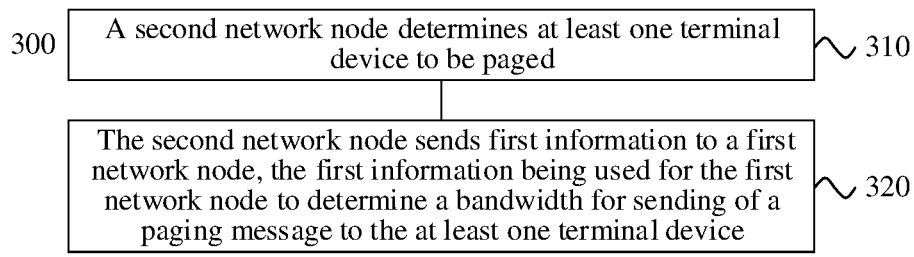
FIG. 4 is another schematic block diagram of a wireless communication method according to an embodiment of the application.

FIG. 4 is a schematic block diagram of a wireless communication method 300 according to an embodiment of the application. As shown in FIG. 4, the method 300 includes the following operations.

In S310, a second network node determines at least one terminal device to be paged.

In S320, the second network node sends first information to a first network node, the first information is used for the first network node to determine a bandwidth for sending of a paging message to the at least one terminal device.

Therefore, the wireless communication method of the embodiment of the application facilitates the improvement of the flexibility for scheduling the paging message.

Optionally, in the embodiment of the application, the first information is an operating bandwidth capability of each of the at least one terminal device, and the method further includes the operation that the second network node determines the operating bandwidth capability of each of the at least one terminal device.

Optionally, in the embodiment of the application, the operation that the second network node determines the operating bandwidth capability of each of the at least one terminal device includes an operation that the second network node determines the operating bandwidth capability of each of the at least one terminal device according to an ID of each terminal device and mapping relationships between an IDs and operating bandwidth capabilities of terminal devices.

Optionally, in the embodiment of the application, the first information is at least one transparent container corresponding to the at least one terminal device, and the at least one transparent container is configured to encapsulate the operating bandwidth capability of each of the at least one terminal device.

Optionally, in the embodiment of the application, the at least one terminal device corresponds to the at least one transparent container one to one.

Optionally, in the embodiment of the application, the second network node is a CN node, and the first network node is a RAN node.

Optionally, in the embodiment of the application, the second network node is a primary RAN node, and the first network node is a secondary RAN node.

It is to be understood that interactions between the second network node, the first network node and the terminal, related properties, functions and the like described from the second network node correspond to related properties and functions described from the first network node. Moreover, the related contents have been described in detail in the method 100 and the method 200 and, for simplicity, will not be elaborated herein.

It is also to be understood that, in various embodiments of the application, a magnitude of a sequence number of each process does not mean an execution sequence and the execution sequence of each process should be determined by its function and an internal logic and should not form any limit to an implementation process of the embodiments of the application.

Figure 5:
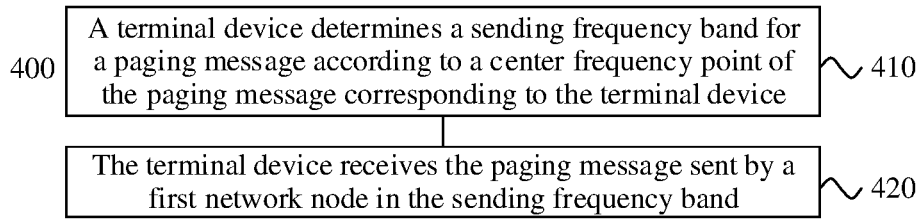
FIG. 5 is still another schematic block diagram of a wireless communication method according to an embodiment of the application.

FIG. 5 is a schematic block diagram of a wireless communication method 400 according to an embodiment of the application. As shown in FIG. 5, the method 400 includes the following operations.

In S410, a terminal device determines a sending frequency band for a paging message according to a center frequency point of the paging message corresponding to the terminal device.

In S420, the terminal device receives the paging message sent by a first network node in the sending frequency band.

Therefore, the wireless communication method of the embodiment of the application facilitates the improvement of the flexibility for scheduling the paging message.

Optionally, in the embodiment of the application, the method further includes operations that: the terminal device determines the center frequency point of the paging message corresponding to the terminal device according to an ID of a terminal group to which the terminal device belongs and mapping relationships between terminal groups and center frequency points; or the terminal device determines the center frequency point of the paging message corresponding to the terminal device according to a bandwidth range to which an operating bandwidth capability of the terminal device belongs and mapping relationships between bandwidth ranges and center frequency points.

Optionally, in the embodiment of the application, before the operation that the terminal device determines the sending frequency band for the paging message according to the center frequency point of the paging message corresponding to the terminal device, the method further includes an operation that the terminal device receives at least one of the following information sent by the first network node: the ID of the terminal group to which the terminal device belongs, the bandwidth range to which the terminal device belongs, the mapping relationships between terminal groups and center frequency points and mapping relationships between bandwidth ranges and center frequency points.

Optionally, in the embodiment of the application, the at least one of the following information is predetermined in a protocol: the ID of the terminal group to which the terminal device belongs, the bandwidth range to which the terminal device belongs, the mapping relationships between terminal groups and the center frequency points and the mapping relationships between the bandwidth ranges and the center frequency points.

Optionally, in the embodiment of the application, the first network node is a RAN node.

It is to be understood that interaction between the terminal device and the first network node, related properties, functions and the like described from the terminal device correspond to related properties and functions described from the first network node. Moreover, the related contents have been described in detail in the method 100 and the method 200 and, for simplicity, will not be elaborated herein.

It is also to be understood that, in various embodiments of the application, a magnitude of a sequence number of each process does not mean an execution sequence and the execution sequence of each process should be determined by its function and an internal logic and should not form any limit to an implementation process of the embodiments of the application.

The wireless communication method according to the embodiments of the application is described above in detail and a wireless communication device according to the embodiments of the application will be described below in combination with FIG. 6 to FIG. 11. The technical characteristics described in the method embodiments are applied to the following device embodiments.

Figure 6:
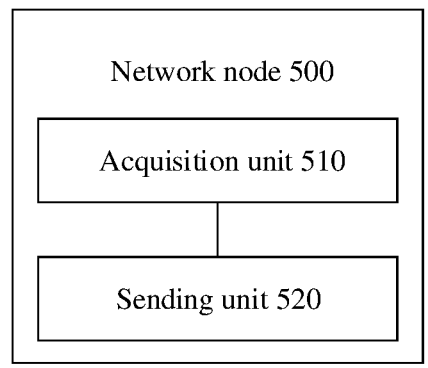
FIG. 6 is a schematic block diagram of a network node according to an embodiment of the application.

FIG. 6 is a schematic block diagram of a network node 500 according to an embodiment of the application. The network node 500 is a first network node. As shown in FIG. 6, the network node 500 includes an acquisition unit 510 and a sending unit 520.

The acquisition unit 510 is configured to acquire an operating bandwidth capability of at least one terminal device to be paged.

The sending unit 520 is configured to send a paging message to the at least one terminal device according to the operating bandwidth capability of the at least one terminal device.

Therefore, the network node of the embodiment of the application facilitates the improvement of the flexibility for scheduling the paging message.

Optionally, in the embodiment of the application, the sending unit 520 is further configured to select a minimum operating bandwidth capability from the operating bandwidth capability of the at least one terminal device and send the paging message to each terminal device according to the minimum operating bandwidth capability.

Optionally, in the embodiment of the application, the at least one terminal device includes multiple terminal devices, and the network node 500 further includes a division unit, configured to divide the multiple terminal devices into multiple terminal groups; and the sending unit is further configured to select a minimum operating bandwidth capability from the operating bandwidth capabilities of all terminal devices in a first terminal group of the multiple terminal group and send the paging message to each terminal device in the first terminal group according to the minimum operating bandwidth capability.

Optionally, in the embodiment of the application, the division unit is further configured to divide the multiple terminal devices into the multiple terminal groups according to at least one bandwidth range.

Optionally, in the embodiment of the application, the sending unit 520 is further configured to determine a sending frequency band for sending of the paging message according to the minimum operating bandwidth capability and send the paging message to each terminal device in the first terminal group in the sending frequency band.

Optionally, in the embodiment of the application, the network node 500 further includes a determination unit, configured to determine a center frequency point of the paging message corresponding to the first terminal group; and the sending unit 520 is further configured to determine the sending frequency band according to the minimum operating bandwidth capability and the center frequency point.

Optionally, in the embodiment of the application, the acquisition unit 510 is further configured to receive the operating bandwidth capability of each of the at least one terminal device from a second network node.

Optionally, in the embodiment of the application, the acquisition unit 510 is further configured to acquire the operating bandwidth capability of each of the at least one terminal device according to an ID of the terminal device and mapping relationships between IDs and operating bandwidth capabilities of a terminal devices.

Optionally, in the embodiment of the application, the acquisition unit 510 is further configured to acquire the operating bandwidth capability of each terminal device from at least one transparent container corresponding to the at least one terminal device.

Optionally, in the embodiment of the application, the at least one terminal device corresponds to the at least one transparent container one to one.

Optionally, in the embodiment of the application, the network node 500 further includes a receiving unit, configured to, under a case that the second network node initiates paging to the at least one terminal device, receive the at least one transparent container sent by the second network node.

Optionally, in the embodiment of the application, the second network node is a CN node, and the first network node is a RAN node.

Optionally, in the embodiment of the application, the second network node is a primary RAN node, and the first network node is a secondary RAN node.

It is to be understood that the network node 500 according to the embodiment of the application may correspond to the first network node in the method embodiments of the application and the abovementioned and other operations and/or functions of each unit in the network node 500 are adopted to implement the flows executed by the first network node in the methods of FIG. 2 and FIG. 3 respectively and will not be elaborated herein for simplicity.

Figure 7:
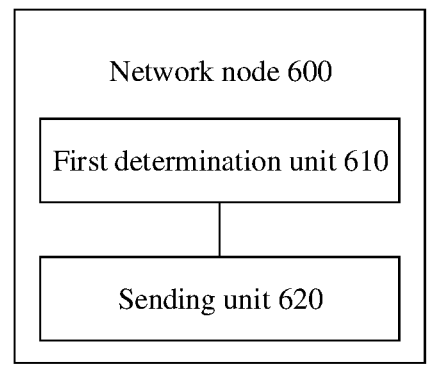
FIG. 7 is another schematic block diagram of a network node according to an embodiment of the application.

FIG. 7 is a schematic block diagram of a network node 600 according to an embodiment of the application. The network node 600 is a second network node. As shown in FIG. 7, the network node 600 includes a first determination unit 610 and a sending unit 620.

The first determination unit 610 is configured to determine at least one terminal device to be paged.

The sending unit 620 is configured to send first information to a first network node, the first information is used for the first network node to determine a bandwidth for sending of a paging message to the at least one terminal device.

Therefore, the network node of the embodiment of the application facilitates the improvement of the flexibility for scheduling the paging message.

Optionally, in the embodiment of the application, the first information is an operating bandwidth capability of each of the at least one terminal device, and the network node 600 further includes a second determination unit, configured to determine the operating bandwidth capability of each of the at least one terminal device.

Optionally, in the embodiment of the application, the second determination unit is further configured to determine the operating bandwidth capability of each of the at least one terminal device according to an ID of the terminal device and mapping relationships between IDs and operating bandwidth capabilities of terminal devices.

Optionally, in the embodiment of the application, the first information is at least one transparent container corresponding to the at least one terminal device, and the at least one transparent container is configured to encapsulate the operating bandwidth capability of each of the at least one terminal device.

Optionally, in the embodiment of the application, the at least one terminal device corresponds to the at least one transparent container one to one.

Optionally, in the embodiment of the application, the second network node is a CN node, and the first network node is a RAN node.

Optionally, in the embodiment of the application, the second network node is a primary RAN node, and the first network node is a secondary RAN node.

It is to be understood that the network node 600 according to the embodiment of the application may correspond to the second network node in the method embodiments of the application and the abovementioned and other operations and/or functions of each unit in the network node 600 are adopted to implement the flow executed by the second network node in the method shown in FIG. 4 and will not be elaborated herein for simplicity.

Figure 8:
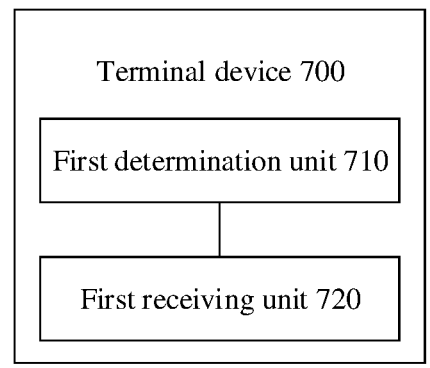
FIG. 8 is a schematic block diagram of a terminal device according to an embodiment of the application.

FIG. 8 is a schematic block diagram of a terminal device 700 according to an embodiment of the application. As shown in FIG. 8, the terminal device 700 includes a first determination unit 710 and a first receiving unit 720.

The first determination unit 710 is configured to determine a sending frequency band for a paging message corresponding to the terminal device according to a center frequency point of the paging message.

The first receiving unit 720 is configured to receive the paging message sent by a first network node in the sending frequency band.

Therefore, the terminal device of the embodiment of the application facilitates the improvement of the flexibility for scheduling the paging message.

Optionally, in the embodiment of the application, the terminal device 700 further includes a second determination unit, configured to determine the center frequency point of the paging message corresponding to the terminal device according to an ID of a terminal group to which the terminal device belongs and mapping relationships between terminal groups and center frequency points or determine the center frequency point of the paging message corresponding to the terminal device according to a bandwidth range to which an operating bandwidth capability of the terminal device belongs and mapping relationships between bandwidth ranges and center frequency points.

Optionally, in the embodiment of the application, the terminal device 700 further includes a second receiving unit, configured to receive at least one of the following information sent by the first network node: the ID of the terminal group to which the terminal device belongs, the bandwidth range to which the terminal device belongs, the mapping relationships between terminal groups and center frequency points and the mapping relationships between bandwidth ranges and center frequency points.

Optionally, in the embodiment of the application, the at least one of the following information is predetermined in a protocol: the ID of the terminal group to which the terminal device belongs, the bandwidth range to which the terminal device belongs, the mapping relationships between terminal groups and center frequency points and the mapping relationships between bandwidth ranges and the center frequency points.

Optionally, in the embodiment of the application, the first network node is a RAN node.

It is to be understood that the terminal device 700 according to the embodiment of the application may correspond to the terminal device in the method embodiment of the application and the abovementioned and other operations and/or functions of each unit in the terminal device 700 are adopted to implement the flow executed by the terminal device in the method of FIG. 5 and will not be elaborated herein for simplicity.

Figure 9:
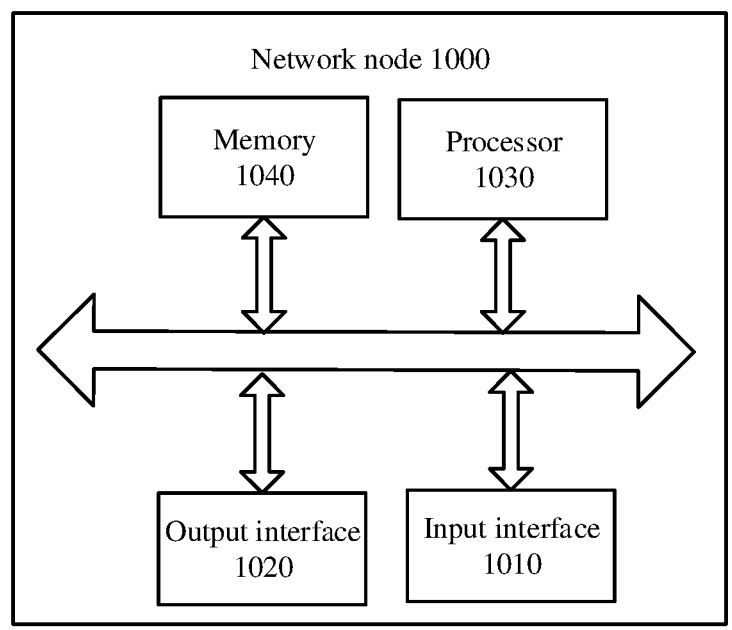
FIG. 9 is still another schematic block diagram of a network node according to an embodiment of the application.

As shown in FIG. 9, an embodiment of the application also provides a network node 1000. The network node 1000 may be the network node 500 in FIG. 6, and may be configured to execute contents of the first network node in each of the methods shown in FIG. 2 and FIG. 3. The network node 1000 includes an input interface 1010, an output interface 1020, a processor 1030 and a memory 1040. The input interface 1010, the output interface 1020, the processor 1030 and the memory 1040 may be connected through a bus system. The memory 1040 is configured to store a program, an instruction or a code. The processor 1030 is configured to execute the program, instruction or code in the memory 1040 to control the input interface 1010 to receive a signal, control the output interface 1020 to send a signal and complete operations in the method embodiments.

Therefore, the network node of the embodiment of the application facilitates the improvement of the flexibility for scheduling the paging message.

It is to be understood that, in the embodiment of the application, the processor 1030 may be a Central Processing Unit (CPU) and the processor 1030 may also be another universal processor, a digital signal processor, an application specific integrated circuit, a field-programmable gate array or another programmable logic device, discrete gate or transistor logic device and discrete hardware component and the like. The universal processor may be a microprocessor or the processor may also be any conventional processor and the like.

The memory 1040 may include a Read-Only Memory (ROM) and a Random Access Memory (RAM) and provides an instruction and data for the processor 1030. A part of the memory 1040 may further include a nonvolatile RAM. For example, the memory 1040 may further store information of a device type.

In an implementation process, the content of each method may be completed by an integrated logic circuit of hardware in the processor 1030 or an instruction in a software form. The contents of the methods disclosed in combination with the embodiments of the application may be directly embodied to be executed and completed by a hardware processor or executed and completed by a combination of hardware and software modules in the processor. The software module may be located in a mature storage medium in this field such as a RAM, a flash memory, a ROM, a programmable ROM or electrically erasable programmable ROM a register, etc. The storage medium is located in the memory 1040. The processor 1030 reads information in the memory 1040 and completes the contents of the method in combination with hardware. No more detailed descriptions will be made herein to avoid repetitions.

In a specific implementation mode, the sending unit of the network node 500 may be implemented by the output interface 1020 in FIG. 9 and the acquisition unit of the network node 500 may be implemented by the processor 1030 in FIG. 9.

Figure 10:
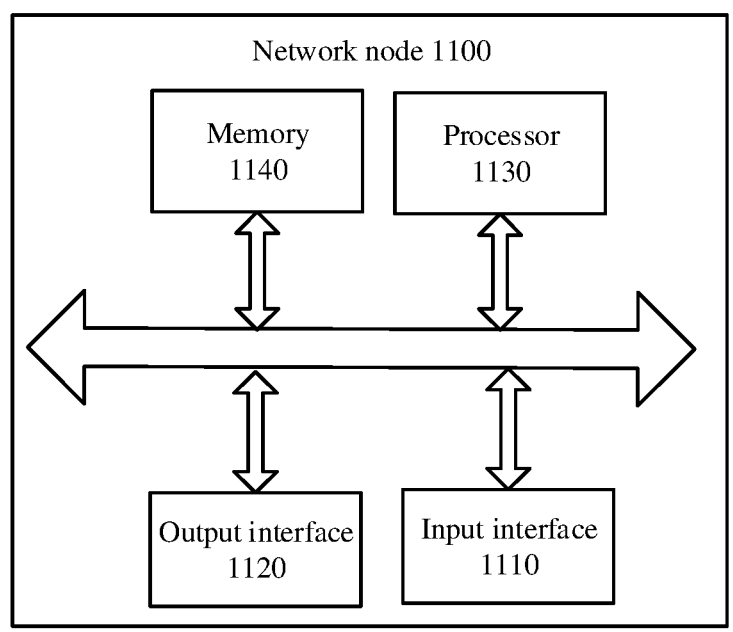
FIG. 10 is still another schematic block diagram of a network node according to an embodiment of the application.

As shown in FIG. 10, an embodiment of the application also provides a network node 1100. The network node 1100 may be the network node 600 in FIG. 7, and may be configured to execute corresponding contents of the second network node in the method in FIG. 4. The network node 1100 includes an input interface 1110, an output interface 1120, a processor 1130 and a memory 1140. The input interface 1110, the output interface 1120, the processor 1130 and the memory 1140 may be connected through a bus system. The memory 1140 is configured to store a program, an instruction or a code. The processor 1130 is configured to execute the program, instruction or code in the memory 1140 to control the input interface 1110 to receive a signal, control the output interface 1120 to send a signal and complete operations in the method embodiments.

Therefore, the network node of the embodiment of the application facilitates the improvement of the flexibility for scheduling the paging message.

It is to be understood that, in the embodiment of the application, the processor 1130 may be a CPU and the processor 1130 may also be another universal processor, a digital signal processor, an application specific integrated circuit, a field-programmable gate array or another programmable logic device, discrete gate or transistor logic device and discrete hardware component and the like. The universal processor may be a microprocessor or the processor may also be any conventional processor and the like.

The memory 1140 may include a ROM and a RAM and provides an instruction and data for the processor 1130. A part of the memory 1140 may further include a nonvolatile RAM. For example, the memory 1140 may further store information of a device type.

In an implementation process, the content of each method may be completed by an integrated logic circuit of hardware in the processor 1130 or an instruction in a software form. The contents of the method disclosed in combination with the embodiments of the application may be directly embodied to be executed and completed by a hardware processor or executed and completed by a combination of hardware and software modules in the processor. The software module may be located in a mature storage medium in this field such as a RAM, a flash memory, a ROM, a programmable ROM or electrically erasable programmable ROM a register, etc. The storage medium is located in the memory 1140. The processor 1130 reads information in the memory 1140 and completes the contents of the method in combination with hardware. No more detailed descriptions will be made herein to avoid repetitions.

In a specific implementation mode, the sending unit of the network node 600 may be implemented by the output interface 1120 in FIG. 10 and the first determination unit of the network node 600 may be implemented by the processor 1130 in FIG. 10.

Figure 11:
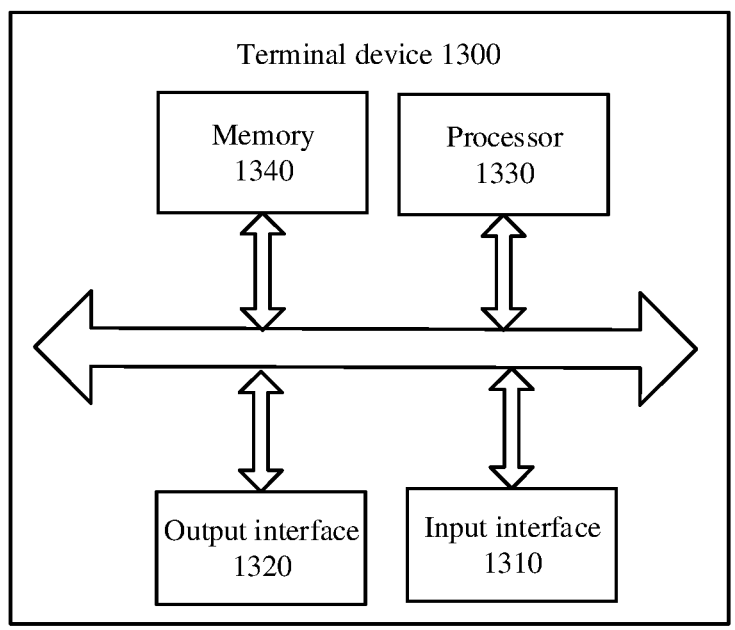
FIG. 11 is another schematic block diagram of a terminal device according to an embodiment of the application.

As shown in FIG. 11, an embodiment of the application also provides a terminal device 1300. The terminal device 1300 may be the terminal device 700 in FIG. 8, and may be configured to execute contents of the terminal device corresponding to the method in FIG. 5. The terminal device 1300 includes an input interface 1310, an output interface 1320, a processor 1330 and a memory 1340. The input interface 1310, the output interface 1320, the processor 1330 and the memory 1340 may be connected through a bus system. The memory 1340 is configured to store a program, an instruction or a code. The processor 1330 is configured to execute the program, instruction or code in the memory 1340 to control the input interface 1310 to receive a signal, control the output interface 1320 to send a signal and complete operations in the method embodiments.

Therefore, the terminal device of the embodiment of the application facilitates the improvement of the flexibility for scheduling the paging message.

It is to be understood that, in the embodiment of the application, the processor 1330 may be a CPU and the processor 1330 may also be another universal processor, a digital signal processor, an application specific integrated circuit, a field-programmable gate array or another programmable logic device, discrete gate or transistor logic device and discrete hardware component and the like. The universal processor may be a microprocessor or the processor may also be any conventional processor and the like.

The memory 1340 may include a ROM and a RAM and provides an instruction and data for the processor 1330. A part of the memory 1340 may further include a nonvolatile RAM. For example, the memory 1340 may further store information of a device type.

In an implementation process, the content of each method may be completed by an integrated logic circuit of hardware in the processor 1330 or an instruction in a software form. The contents of the method disclosed in combination with the embodiments of the application may be directly embodied to be executed and completed by a hardware processor or executed and completed by a combination of hardware and software modules in the processor. The software module may be located in a mature storage medium in this field such as a RAM, a flash memory, a ROM, a programmable ROM or electrically erasable programmable ROM a register, etc. The storage medium is located in the memory 1340. The processor 1330 reads information in the memory 1340 and completes the contents of the method in combination with hardware. No more detailed descriptions will be made herein to avoid repetitions.

In a specific implementation mode, the first determination unit of the terminal device 700 may be implemented by the processor 1330 in FIG. 11 and the first receiving unit of the terminal device 700 may be implemented by the input interface 1310 in FIG. 11.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the application.

Those skilled in the art may clearly learn about those specific operating processes of the system, device and unit described above may refer to the corresponding processes in the method embodiment and will not be elaborated herein for convenient and brief description.

In some embodiments provided by the application, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the application may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the application substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of each embodiment of the application. The storage medium includes: various media capable of storing program codes such as a U disk, a mobile hard disk, a ROM, a RAM, a magnetic disk or an optical disk.

The above is only the specific implementation mode of the application and not intended to limit the scope of protection of the application. Any variations or replacements apparent to those skilled in the art within the technical scope disclosed by the application shall fall within the scope of protection of the application. Therefore, the scope of protection of the application shall be subject to the scope of protection of the claims.

The invention claimed is:

1. A terminal device, comprising:
   a memory, configured to store an instruction;
   a processor;
   an input interface and an output interface,
   wherein the processor is configured to execute the instruction stored in the memory to execute the following operations:
      determining a center frequency point of a paging message corresponding to the terminal device according to a bandwidth range to which an operating bandwidth capability of the terminal device belongs and mapping relationships between bandwidth ranges and center frequency point;
      determining a sending frequency band for the paging message corresponding to the terminal device according to the center frequency point of the paging message; and
      receiving the paging message sent by a first network node in the sending frequency band via the input interface.

2. The terminal device of claim 1, wherein the processor is configured to execute the instruction stored in the memory to
   receive at least one of the following information sent by the first network node via the input interface:
      an Identifier (ID) of a terminal group to which the terminal device belongs, the bandwidth range to which the terminal device belongs, the mapping relationships between terminal groups and center frequency points and the mapping relationships between bandwidth ranges and center frequency points.

3. The terminal device of claim 1, wherein the at least one of the following information is predetermined in a protocol: an Identifier (ID) of a terminal group to which the terminal device belongs, the bandwidth range to which the terminal device belongs, the mapping relationships between terminal groups and center frequency points and the mapping relationships between bandwidth ranges and center frequency points.

4. The terminal device of claim 1, wherein the first network node is a Radio Access Network (RAN) node.

5. A method for wireless communication, comprising:
   determining, by a terminal device, a center frequency point of a paging message corresponding to the terminal device according to a bandwidth range to which an operating bandwidth capability of the terminal device belongs and mapping relationships between bandwidth ranges and center frequency points;
   determining, by the terminal device, a sending frequency band for the paging message corresponding to the terminal device according to the center frequency point of the paging message; and
   receiving, by the terminal device, the paging message sent by a first network node in the sending frequency band.

6. The method of claim 5, further comprising: before determining, by the terminal device, the sending frequency band for the paging message corresponding to the terminal device according to the center frequency point of the paging message,
   receiving, by the terminal device, at least one of the following information sent by the first network node:
      an Identifier (ID) of a terminal group to which the terminal device belongs, the bandwidth range to which the terminal device belongs, the mapping relationships between terminal groups and center frequency points and the mapping relationships between bandwidth ranges and center frequency points.

7. The method of claim 5, wherein the at least one of the following information is predetermined in a protocol: an Identifier (ID) of a terminal group to which the terminal device belongs, the bandwidth range to which the terminal device belongs, the mapping relationships between terminal groups and center frequency points and the mapping relationships between bandwidth ranges and center frequency points.

8. The method of claim 5, wherein the first network node is a Radio Access Network (RAN) node.

* * * * *